United States Patent
Atsatt

(10) Patent No.: US 10,446,202 B1
(45) Date of Patent: Oct. 15, 2019

(54) INCREASING ERROR RATE DETECTION THROUGH DISTRIBUTION OF READ CURRENT LOAD

(71) Applicant: Altera Corporation, San Jose, CA (US)

(72) Inventor: Sean R. Atsatt, Santa Cruz, CA (US)

(73) Assignee: Altera Corporation, San Jose, CA (US)

(*) Notice: Subject to any disclaimer, the term of this patent is extended or adjusted under 35 U.S.C. 154(b) by 74 days.

(21) Appl. No.: 15/338,074

(22) Filed: Oct. 28, 2016

(51) Int. Cl.
- G06F 1/26 (2006.01)
- G11C 7/22 (2006.01)
- G06F 3/06 (2006.01)
- G11C 5/14 (2006.01)
- G06F 17/50 (2006.01)

(52) U.S. Cl.
CPC ............ *G11C 7/22* (2013.01); *G06F 3/0619* (2013.01); *G06F 3/0629* (2013.01); *G06F 3/0683* (2013.01); *G06F 17/5022* (2013.01); *G06F 17/5054* (2013.01); *G06F 17/5072* (2013.01); *G06F 17/5081* (2013.01); *G11C 5/14* (2013.01)

(58) Field of Classification Search
CPC ........................................................ G06F 1/26
USPC ........................................................ 713/300
See application file for complete search history.

(56) References Cited

U.S. PATENT DOCUMENTS

| | | | |
|---|---|---|---|
| 8,793,558 B2* | 7/2014 | Cunningham | G06F 11/1048 365/185.2 |
| 2003/0174573 A1* | 9/2003 | Suzuki | G11C 7/06 365/230.03 |
| 2011/0029789 A1* | 2/2011 | Tsai | G06F 1/26 713/300 |
| 2014/0108850 A1* | 4/2014 | Simolon | G06F 1/14 713/502 |
| 2015/0318029 A1* | 11/2015 | Liu | H01L 29/4983 365/189.16 |
| 2016/0162002 A1* | 6/2016 | Liang | G06F 1/3206 713/323 |
| 2017/0090802 A1* | 3/2017 | Margetts | G06F 3/0679 |
| 2017/0212692 A1* | 7/2017 | Camp | G06F 3/0611 |

* cited by examiner

Primary Examiner — Min Huang
(74) Attorney, Agent, or Firm — Fletcher Yoder, P.C.

(57) ABSTRACT

Methods and devices for increasing error detection rate while avoiding excessive power distribution network noise are provided. In one method, memory reads of configuration memory of a first group of sectors of a programmable logic device are performed. The memory reads start at a first start time within a first memory read period. The first memory read period includes an amount of time involved to perform one of the memory reads. The method also includes performing memory reads of configuration memory of a second group of sectors of the programmable logic device. The memory reads of the configuration memory of the second group of sectors start at a second start time within the first memory read period. The second start time is different from the first start time. By offsetting the start times of memory reads, power distribution noise may be reduced.

17 Claims, 10 Drawing Sheets

US 10,446,202 B1

INCREASING ERROR RATE DETECTION THROUGH DISTRIBUTION OF READ CURRENT LOAD

BACKGROUND

This disclosure relates to error detection in an integrated circuit device by distributing starts of configuration memory reads temporally and/or spatially across an integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Programmable logic devices are a class of integrated circuits that can be programmed to perform a wide variety of operations. A programmable logic device may include programmable logic elements programmed by a form of memory known as configuration random access memory (CRAM). Thus, to program a circuit design into a programmable logic device, the circuit design may be compiled into a bitstream and programmed into CRAM cells. The values programmed into the CRAM cells define the operation of programmable logic elements of the programmable logic device.

As such, any change in the values stored in the CRAM cells can affect the operation of the operation of the programmable logic device. Yet the values stored in the CRAM cells may change undesirably under certain conditions, such as by device tampering or single event upsets (SEUs). Single event upsets occur when ionizing radiation strikes (e.g., from cosmic rays) discharge the charge in the storage of the CRAM cells. As programmable logic devices increasingly include higher densities of CRAM cells, single event upsets are becoming increasingly more common.

To confirm that the CRAM cells contain proper values, and thereby confirm the desired operation of the programmable logic device, it may be desirable to occasionally read the values stored in the CRAM cells. Reading the CRAM cells draws power, however, which could introduce new errors in the form of noise or jitter on the power distribution network. Moreover, if the jitter or noise on the power distribution network work grows too large, the jitter or noise could cause the values stored in the CRAM cells to become corrupted or disrupt other features of the device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To increase the rate that CRAM cells can be read without introducing excessive jitter or noise on the power distribution network, CRAM reads may be distributed over time and location of a programmable logic device. By increasing the rate that the CRAM cells can be read, the error detection rate may increase, thereby allowing errors of the programmable logic device to be detected more quickly. To this end, the CRAM reads may be structured to avoid drawing too much instantaneous current from the power distribution network at any point in time or any particular location on the power distribution network. This may be done through temporal or spatial, or both temporal and spatial, distribution of CRAM reads.

In one example, a programmable logic device that contains multiple sectors of programmable logic fabric may structure CRAM reads so that not all of the sectors are read from at any one time. Different groups of sectors may start CRAM reads at different offsets in time from a shared global read start time. During one CRAM read period, a first sector or group of sectors may begin a CRAM read immediately at the start of the CRAM read period, causing a first brief instantaneous current spike. A sector or group of sectors may begin a CRAM read some offset in time after the start of the CRAM read period, causing a second brief instantaneous current spike. Because the first and second current spikes are offset from one another, a lower amount of instantaneous current is drawn from the power distribution network, even while the average amount may be substantially the same. In this way, CRAM reads may take place at a higher rate than might be possible if the CRAM reads from both sectors or groups of sectors took place at the same point in time.

In other examples, the sector read times may be controlled at least partly based on the location of the sectors being read in relation to one another. For example, a sector may not begin reading its CRAM cells at the same time as another adjacent sector, but may begin reading its CRAM cells at the same time as a sector that is remote by some distance apart on the power distribution network. Additionally or alternatively, the sectors that are allowed to start a CRAM read vary depending on various device conditions, such as a condition of the power distribution network (e.g., voltage level, noise level, current drawn), device temperature, or a current operation of a program stored in the programmable logic device. This may prevent an excessive amount of noise or jitter on the power distribution network due to error detection. In some cases, the rate of error detection may dynamically increase when the noise on the power distribution network is lower, and be throttled when the noise on the power distribution network is higher.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
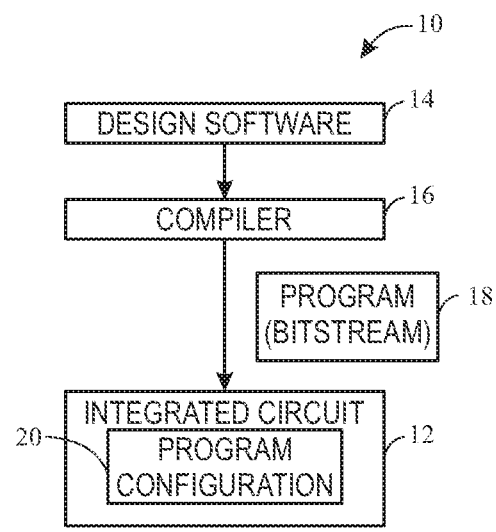
FIG. 1 is a block diagram of an integrated circuit that is programmed with a circuit design that can be verified using error detection, in accordance with an embodiment.

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

This disclosure relates to error detection of configuration random access memory (CRAM) cells that may store configuration values of a programmable logic device fabric. Changes in the values stored in the CRAM cells can affect the operation of the operation of the programmable logic device. Yet the values stored in the CRAM cells may change undesirably under certain conditions, such as by device tampering or single event upsets (SEUs). Single event upsets occur when ionizing radiation strikes (e.g., from cosmic rays) discharge the charge in the storage of the CRAM cells. As programmable logic devices increasingly include higher densities of CRAM cells, single event upsets are becoming increasingly more common.

To confirm that the CRAM cells contain proper values, and thereby confirm the desired operation of the programmable logic device, it may be desirable to occasionally read the values stored in the CRAM cells. Reading the CRAM cells draws power, however, which could introduce new errors in the form of noise or jitter on the power distribution network. Moreover, if the jitter or noise on the power distribution network work grows too large, the jitter or noise could cause the values stored in the CRAM cells to become corrupted or could disrupt other features of the device.

To increase the rate that CRAM cells can be read without introducing excessive jitter or noise on the power distribution network, CRAM reads may be distributed over time and location of a programmable logic device. By increasing the rate that the CRAM cells can be read, the error detection rate may increase, thereby allowing errors of the programmable logic device to be detected more quickly. To this end, the CRAM reads may be structured to avoid drawing too much instantaneous current from the power distribution network at any point in time or any particular location on the power distribution network. This may be done through temporal or spatial, or both temporal and spatial, distribution of CRAM reads.

With the foregoing in mind, FIG. 1 illustrates a block diagram of a system 10 that may enable an increased rate that CRAM cells can be read without introducing excessive jitter or noise on the power distribution network. As discussed above, a designer may implement functionality on an integrated circuit, such as a reconfigurable integrated circuit 12, such as a field programmable gate array (FPGA). The designer may implement a circuit design to be programmed onto the IC 12 using design software 14, such as a version of Quartus by Altera™. The design software 14 may use a compiler 16 to generate a low-level circuit-design program (bitstream) 18, sometimes known as a program object file, that programs the integrated circuit 12. That is, the compiler 16 may provide machine-readable instructions representative of the circuit design to the IC 12. For example, the IC 12 may receive one or more programs (bitstreams) 18 that describe the hardware implementations that should be stored in the IC 12. The programs (bitstreams) 18 may programmed into the IC 12 as a configuration program 20.

Figure 2:
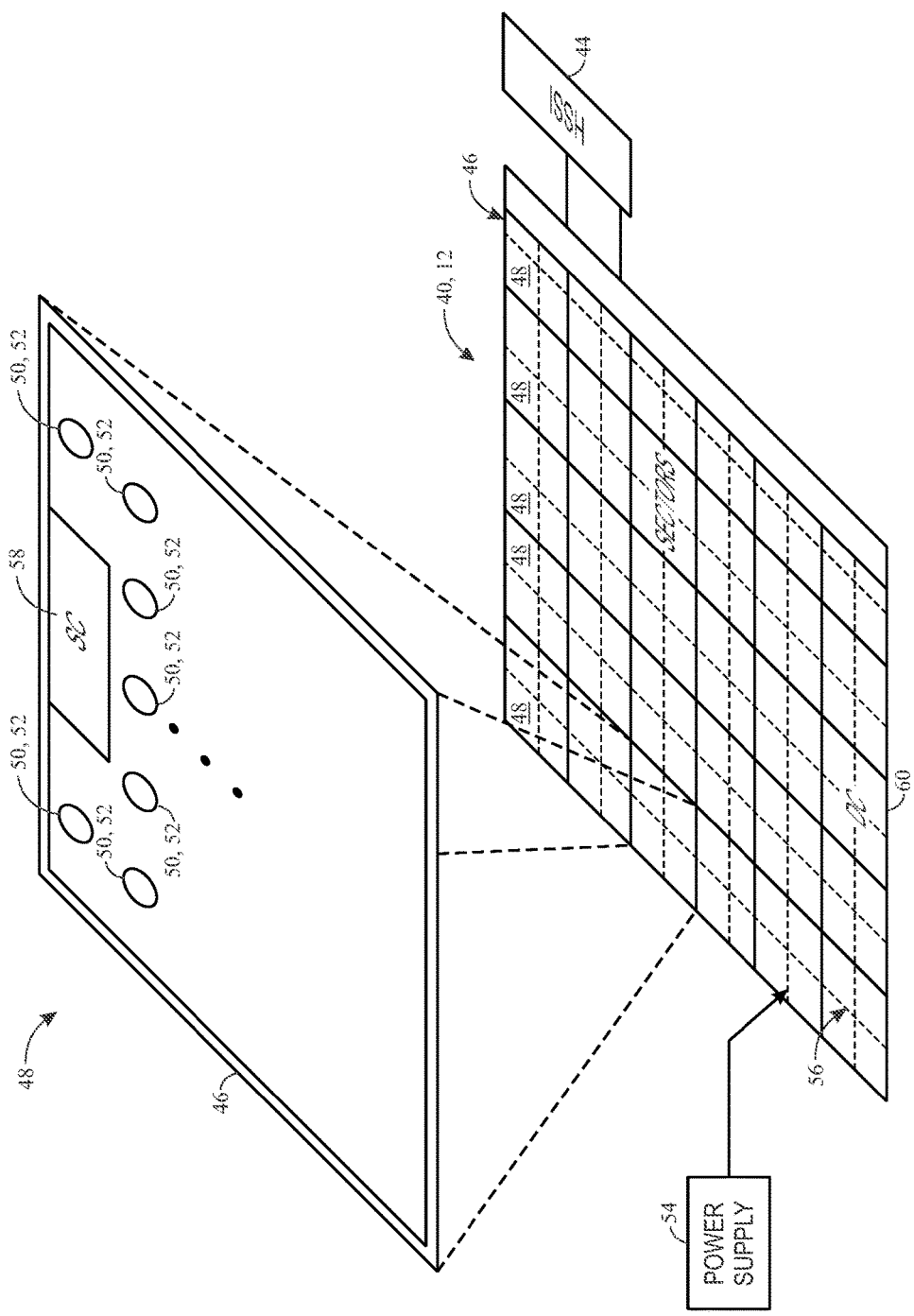
FIG. 2 is a block diagram of an integrated circuit that includes multiple sectors of programmable logic, in accordance with an embodiment.

The IC 12 may be a programmable logic device, such as a field programmable gate array (FPGA) 40, as shown in FIG. 2. For the purposes of this example, the FPGA 40 is referred to as an FPGA, though it should be understood that the device may be any suitable type of programmable logic device (e.g., an application-specific integrated circuit and/or application-specific standard product). In one example, the FPGA 40 is a sectorized FPGA of the type described in U.S. Application No. 20160049941, "Programmable Circuit Having Multiple Sectors," which is incorporated by reference in its entirety for all purposes.

In the example of FIG. 2, the FPGA 40 may include transceiver circuitry 44 for driving signals off of the FPGA 40 and for receiving signals from other devices. Interconnection resources 46 may be used to route signals, such as clock or data signals, through the FPGA 40. The FPGA 40 of FIG. 2 is sectorized, meaning that programmable logic resources may be distributed through a number of discrete programmable logic sectors 48. Each programmable logic sector 48 may include a number of programmable logic elements 50 having operations defined by configuration memory 52 (e.g., configuration random access memory (CRAM)). The programmable logic elements 50 may include combinational or sequential logic circuitry. For example, the programmable logic elements 50 may include look-up tables, registers, multiplexers, routing wires, and so forth. A designer may program the programmable logic elements 50 to perform a variety of desired functions. A power supply 54 may provide a source of voltage and current to a power distribution network (PDN) 56 that distributes electrical power to the various components of the FPGA 40. Operating the circuitry of the FPGA 40 causes power to be drawn from the power distribution network 56.

There may be any suitable number of programmable logic sectors 48 on the FPGA 40. Indeed, while 29 programmable logic sectors 48 are shown here, it should be appreciated that more or fewer may appear in an actual implementation (e.g., in some cases, on the order of 50 to 100 sectors or more). Each programmable logic sector 48 may include a sector controller (SC) 58 that controls the operation of the programmable logic sector 48. Each sector controller 58 may be in communication with a device controller (DC) 60. Each sector controller 58 may accept commands and data from the device controller 60, and may read data from and write data into its configuration memory 52 based on control signals from the device controller 60. In addition to these operations, the sector controller 58 may be augmented with numerous additional capabilities. For example, such capabilities may include locally sequencing reads and writes to implement error detection and correction on the configuration memory 52 and sequencing test control signals to effect various test modes.

The sector controllers 58 and the device controller 60 may be implemented as state machines and/or processors. For example, each operation of the sector controllers 58 or the device controller 60 may be implemented as a separate routine in a memory containing a control program. This control program memory may be fixed in a read-only memory (ROM) or stored in a writable memory, such as random access memory (RAM). The ROM may have a size larger than would be used to store only one copy of each routine. This may allow each routine to have multiple variants depending on "modes" the local controller may be placed into. When the control program memory is implemented as random access memory (RAM), the RAM may be written with new routines to implement new operations and functionality into the programmable logic sectors 48. This may provide usable extensibility in an efficient and easily understood way. This may be useful because new commands could bring about large amounts of local activity within the sector at the expense of only a small amount of communication between the device controller 60 and the sector controllers 58.

Each sector controller 58 thus may communicate with the device controller 60, which may coordinate the operations of the sector controllers 58 and convey commands initiated from outside the FPGA device 40. To support this communication, the interconnection resources 46 may act as a network between the device controller 60 and each sector controller 58. The interconnection resources may support a wide variety of signals between the device controller 60 and each sector controller 58. In one example, these signals may be transmitted as communication packets.

The FPGA 40 may be electrically programmed. With electrical programming arrangements, the programmable elements 50 may include one or more logic elements (wires, gates, registers, etc.). For example, during programming, configuration data is loaded into the configuration memory 52 using pins 44 and input/output circuitry 42. In one example, the configuration memory 52 may be implemented as configuration random-access-memory (CRAM) cells. The use of configuration memory 52 based on RAM technology is described herein is intended to be only one example. Moreover, configuration memory 52 may be distributed (e.g., as RAM cells) throughout the various programmable logic sectors 48 the FPGA 40. The configuration memory 52 may provide a corresponding static control output signal that controls the state of an associated programmable logic element 50 or programmable component of the interconnection resources 46. The output signals of the configuration memory 52 may configure the may be applied to the gates of metal-oxide-semiconductor (MOS) transistors that control the states of the programmable logic elements 50 or programmable components of the interconnection resources 46.

The sector controllers 58 and/or the device controller 60 may determine when each sector controller 58 performs a CRAM read operation on the configuration memory 52 of its programmable logic sector 48. Each time the sector controller 58 performs a CRAM read of the configuration memory 52, power is drawn from the power distribution network 56. If too much power is drawn from the power distribution network 56 at any one time, the voltage provided by the power distribution network 56 could drop to an unacceptably low level, or too much noise could arise on the power distribution network 56. To avoid this, the device controller 60 and/or the sector controllers 58 may structure CRAM reads of the programmable logic sectors 48 to avoid excessive instantaneous power consumption by temporally and/or spatially distributing the CRAM reads across different programmable logic sectors 48.

Figure 3:
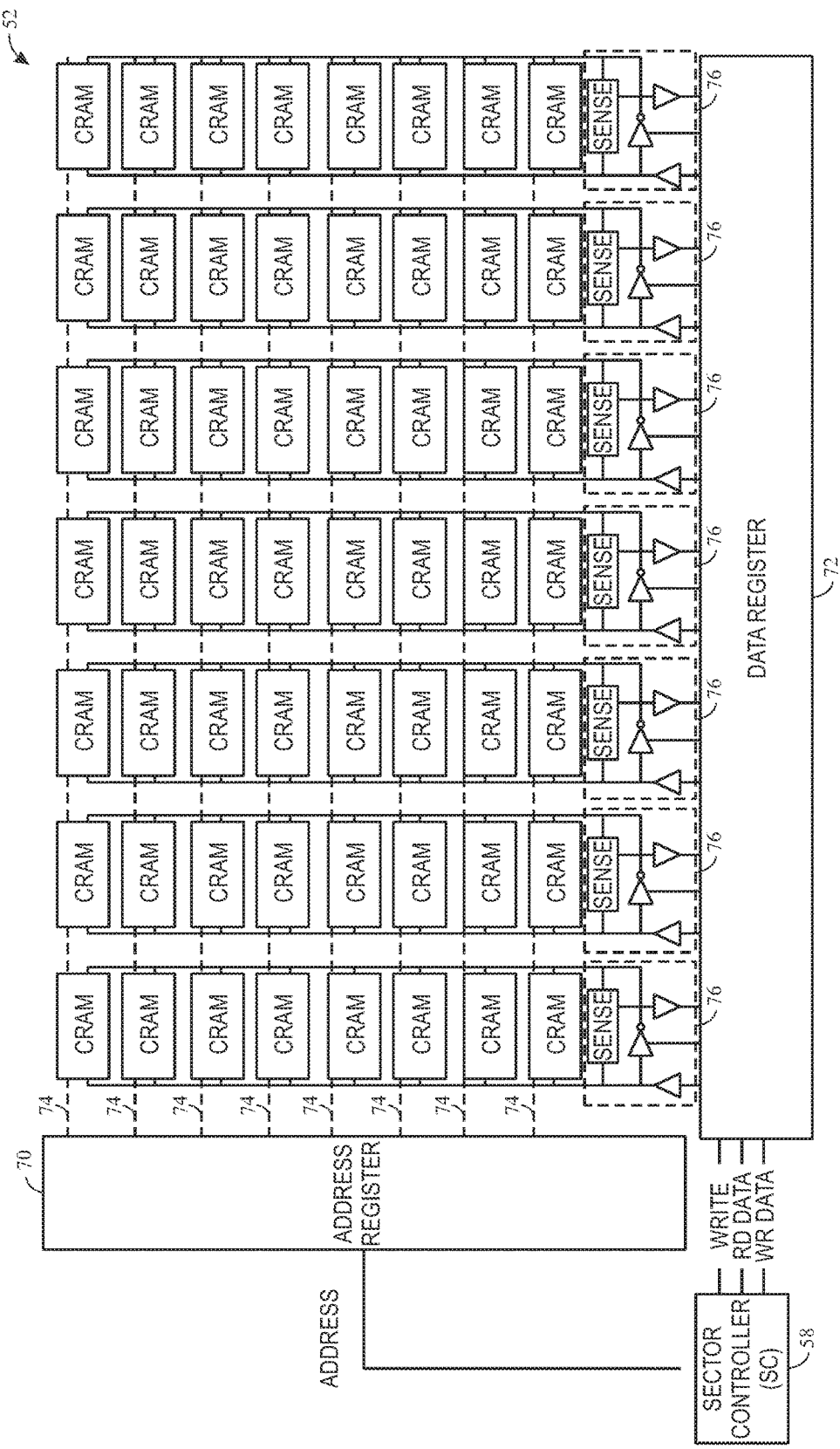
FIG. 3 is a block diagram of configuration random access memory (CRAM) that may program the operation of the programmable logic, in accordance with an embodiment.

A simplified example of the configuration memory 52 of one of the programmable logic sectors 48 appears in FIG. 3. The sector controller 58 of the programmable logic sector 48 is shown to read and write to the CRAM memory 52 by providing an ADDRESS signal to an address register 70 and providing a memory write signal (WRITE), a memory read signal (RD DATA), and/or the data to be written (WR DATA) to a data register 72. These signals may be used to cause the data register 72 to write data to or read data from a line of configuration memory 52 that has been activated along an address line 74, as provided by the ADDRESS signal applied to the address register 70. Memory read/write circuitry 76 may be used to write data into the activated configuration memory 52 cells when the data register 72 is writing data, and may be used to sense and read data from the activated configuration memory 52 cells when the data register 72 is reading data.

Figure 4:
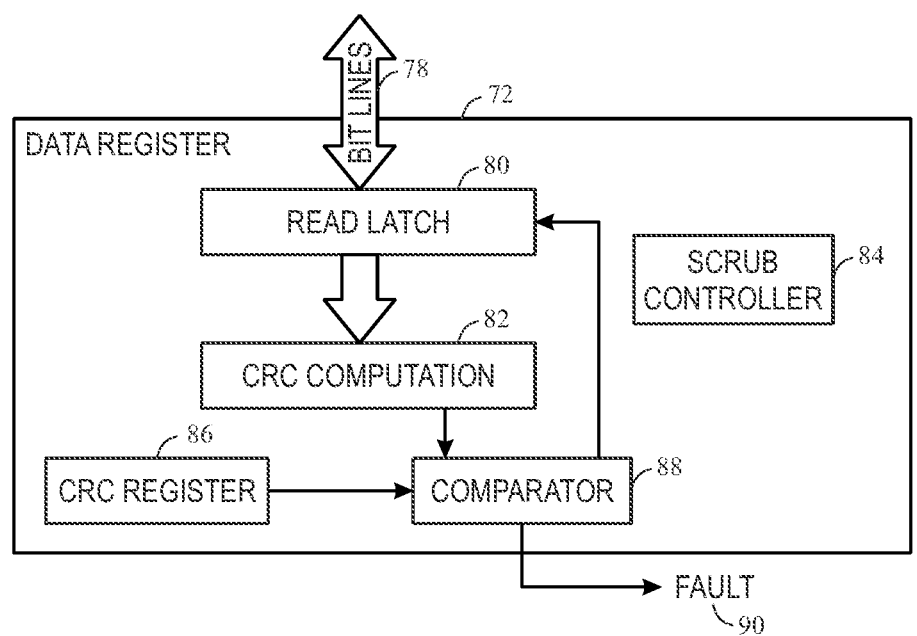
FIG. 4 is a block diagram of circuitry to detect and correct for errors due to single-event upsets (SEUs) or tampering, in accordance with an embodiment.

Reading the configuration memory 52 allows for error detection and correction for errors arising from single-event upsets (SEUs) or tampering. Since the structure of the program configuration 20 is stored the configuration memory 52, an SEU or tampering may alter the program configuration 20 and hence its function. As such, SEU mitigation is a consideration for programmable circuits, such as FPGAs. To address this issue, the configuration memory 52 may be read occasionally (e.g., periodically or substantially continuously), and various error checking techniques may detect and correct errors in the configuration memory 52. Updates may be written back into the configuration memory 52 to correct for these errors as desired. FIG. 4 depicts an illustrative embodiment of such circuitry. In one example, the data register 72 may receives bit lines 78 from the configuration memory 52 into a read latch or latches 80. A cyclic redundancy check (CRC) computation block 82, which may be controlled by a scrub controller 84, may compute a current CRC value that is compared to an expected CRC value from a CRC register 86. When these are compared in a comparator 88, any deviation may signal a fault 90. The fault 90 may indicate that an error has arisen somewhere in the configuration memory 52 and allow the sector controller 58, the device controller 60, or the scrub controller 84 to take action in response. For example, detected errors may be corrected by restoring the configuration memory 52 using a previously stored copy of the data or other redundant information.

Figure 5:
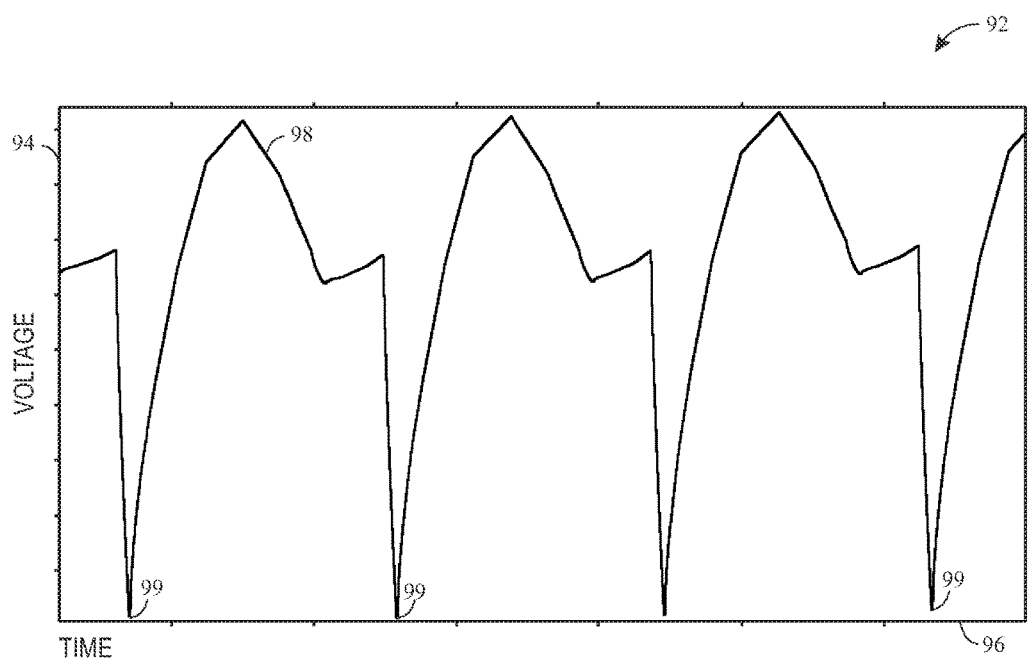
FIG. 5 is a plot illustrating voltage variation on a power distribution network of the integrated circuit when read operations are performed, in accordance with an embodiment.

Since it may be desirable to perform this error detection and correction as often as feasible, thereby reducing possible erroneous operation of the configuration program 20, CRAM reads may be carried out quickly and in many programmable logic sectors 48 at once. Performing each CRAM read operation may involve a considerable initial spike of electrical current, however, which may cause a voltage level of the power distribution network 56 to temporarily drop. This is shown by a plot 92 in FIG. 5, which represents voltage level (ordinate 94) in relation to time (abscissa 96) while a CRAM read operation is occurring. A curve 98 of the voltage exhibits a substantial voltage drop 99 that begins when configuration memory 52 are activated by an address line 74 and starts being read by the data register 72. Each word (or frame) of configuration memory 52 that is read may draw a significant amount of current, driving the reading of the configuration memory 52 cells may span the entire programmable logic sector 48. After this initial spike, however, there is a delay between the voltage drops 99. This is because it takes time for the data to be read out of the data register 72 after being read from the configuration memory 52 activated by the address line 74.

Figure 6:
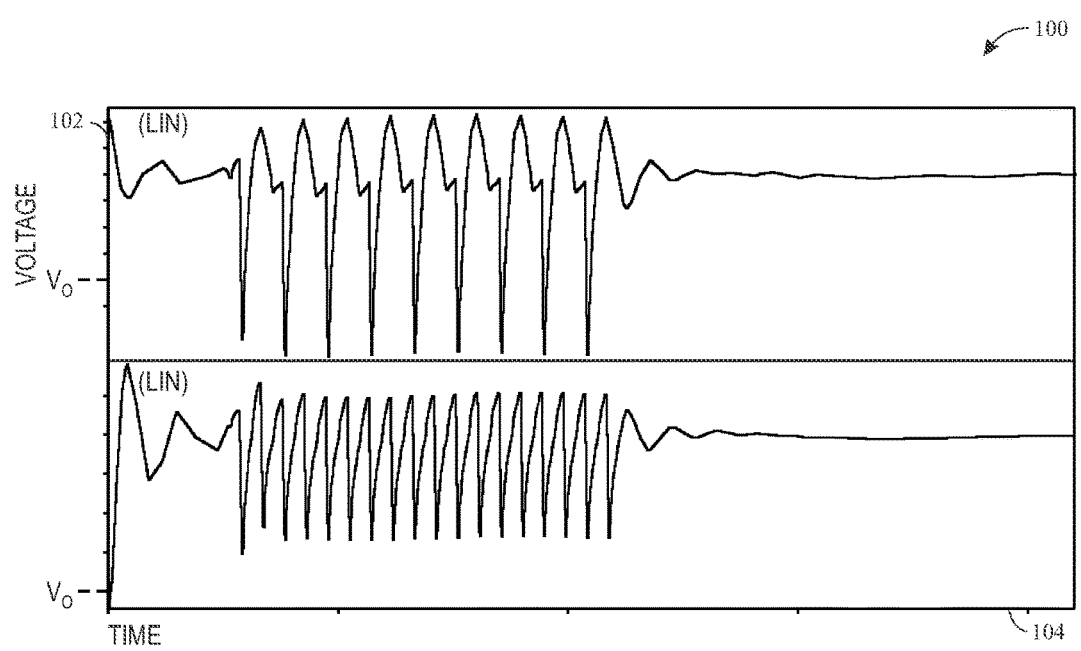
FIG. 6 is a plot of voltage variations when eight sectors of programmable logic perform a CRAM read at the same time, which is compared to voltage variations when the eight sectors of programmable logic perform a CRAM read, with CRAM reads of four sectors offset in time from the other four, in accordance with an embodiment.

A pair of plots 100 shown in FIG. 6 compares the impact of starting CRAM reads on eight programmable logic sectors 48 all at one time in comparison to distributing the start of the CRAM reads in time. In the plots 100 of FIG. 6, voltage provided by the power distribution network 56 (ordinate 102) is shown in relation to time (abscissa 104) during a series of CRAM read operations in eight programmable logic sectors 48. As seen in the upper one of the plots 100, voltage dips below an acceptable voltage threshold $V_0$ when the CRAM reads all start at the same time within each CRAM read period. On the other hand, in the lower one of the plots 100, the same eight programmable logic sectors 48 are perform CRAM reads at the same average rate. However, four programmable logic sectors 48 start the CRAM reads at a first time during each CRAM read period, and the remaining four start the CRAM reads at a second time offset from the first time during each CRAM read period. As a result, the voltage dips do not fall below the acceptable voltage level $V_0$. This may allow for either more voltage margin in the power distribution network 56 or for increasing the read rate of the configuration memory 52 without excessive noise on the power distribution network 56.

Figure 7:
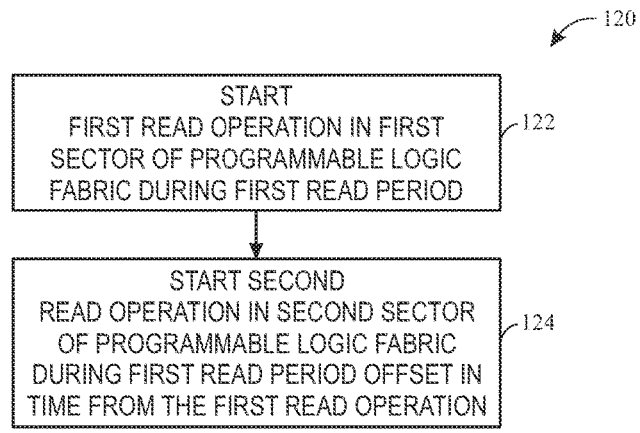
FIG. 7 is a flowchart of a method for increasing CRAM read rates by distributing CRAM read start times, in accordance with an embodiment.

An example method for distributing CRAM reads in time is described by a flowchart 120 of FIG. 7. In the flowchart 120, a first CRAM read operation may start at a first time in a first programmable logic sector 48 (block 122). A second CRAM read operation may start in a different programmable logic sector 48 during the same first read period, but offset in time from the start of the first read operation of (block 124).

Figure 8:
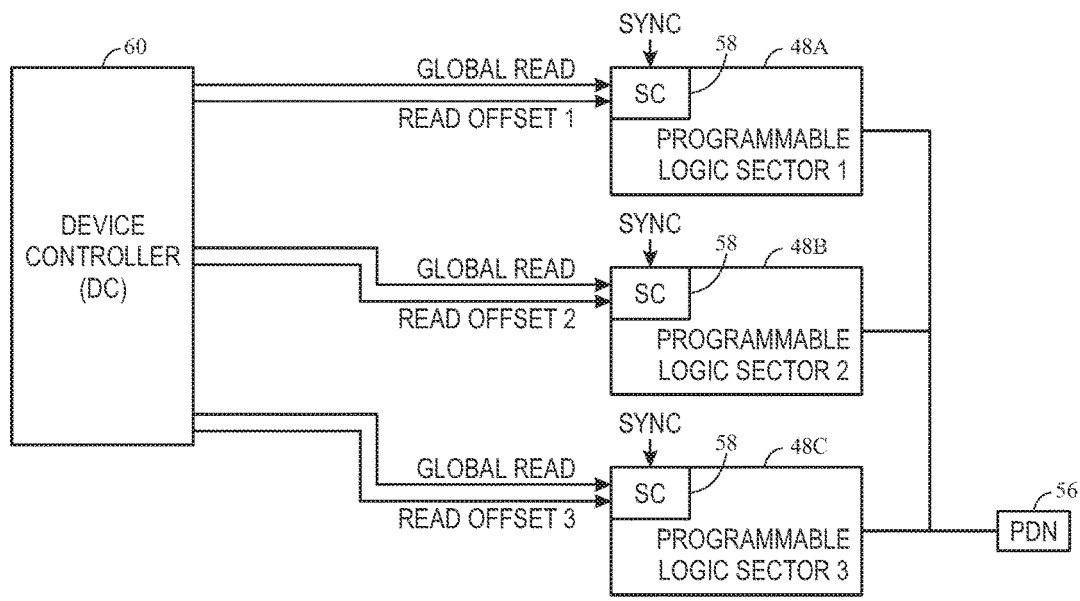
FIG. 8 is a block diagram of circuitry that may cause the CRAM reads of different sectors to be offset from one another, thereby increasing the rate of error detection without excessive noise on the power distribution network, in accordance with an embodiment.

A block diagram of FIG. 8 represents one example of circuitry that may be used to control CRAM read operations of the programmable logic sectors 48 by distributing the CRAM read start times temporally to avoid excessive power distribution noise or jitter. In the example of FIG. 8, each programmable logic sector 48 (here, illustrated as a first programmable logic sector 48A, a second programmable logic sector 48B, and a third programmable logic sector 48C) may receive a synchronization signal SYNC. The synchronization signal SYNC is asserted to the sector controllers 58 to synchronize each sector controller 58 to a common point in time. There may be an insertion delay of the synchronization signal SYNC that is known a priori for each programmable logic sector 48; as a result, each sector controller 58 may set an internal global timer using the synchronization signal SYNC and the known insertion delay.

Because the sector controllers 58 may have synchronized internal global timers, the behavior of the programmable logic sectors 48A, 48B, and 48C can be coordinated in time. The device controller (DC) 60 may provide a number of signals to the sector controllers 58. While the separate signals are schematically illustrated being asserted to the sector controllers 58 on different lines, it should be understood that these signals may be sent in packetized form on a single channel or may be sent using any other suitable form of communication. The device controller (DC) 60 may provide a global read signal (e.g., GLOBAL READ) to indicate a global read time that the sector controllers 58 are instructed to identify as a start of a CRAM read period. In addition, different programmable logic sectors 48 or groups of programmable logic sectors 48 may receive certain different read offset signals (e.g. READ OFFSET 1, READ OFFSET 2, READ OFFSET 3) that indicate an offset from the global read time to start a CRAM read operation, such that not all of the programmable logic sectors 48 start CRAM read operations at the same time.

Consider an example where the total time involved in a CRAM read operation is 200 ns, a CRAM read current pulse width is 40 ns, a CRAM read current settling time is 10 ns, and a global time uncertainty factor is 16 ns. To cause the voltage dips from concurrent CRAM read operations not to entirely overlap, the CRAM read operations may be initiated at time spaced apart by at least 40 ns+10 ns+16 ns=66 ns (accounting for the CRAM read current pulse width, CRAM read current settling time, and the global time uncertainty). Since there are only three 66 ns windows in the 200 ns CRAM read operation time, at most three separate CRAM read operation starts may begin within a CRAM read operation period. Thus, in this example, the programmable logic sectors 48 may be divided into three groups as shown in FIG. 8, with read offset values that are 66 ns apart from one another.

As mentioned briefly above, the GLOBAL READ signal may indicate a global start time for a CRAM read operation. This may be a time that all of the sector controllers 58 use as a reference when starting CRAM read operations. The GLOBAL READ signal may indicate a time that is far enough in the future that each sector controller 58 may initiate all pre-work involved in a CRAM read before this time occurs. The read offset signals (e.g., READ OFFSET 1, READ OFFSET 2, and READ OFFSET 3) may each represent an offset time from the GLOBAL READ start time associated with the group of programmable logic sectors 48. In the example of offsets discussed above, the READ OFFSET 1 may be 0 ns, the READ OFFSET 2 may be 66 ns, and the READ OFFSET 3 may be 132 ns.

Each sector controller 58 may read from a global timer internal to that sector controller 58, and subtract the value of the global timer from the global start time indicated in the GLOBAL READ signal. The sector controller 58 may add the offset time from the READ OFFSETS 1, READ OFFSET 2, or READ OFFSET 3 signal to add to this value and may enter a delay loop that delays the start of the CRAM read operation to be delayed by this amount of time. Because each sector controller 58 may execute the same code, running on the same clock, the CRAM read operations may occur at the same time offset in each loop.

With the example of FIG. 8 still in mind, it should be understood that different groups of programmable logic sectors 48 that receive the same read offset signals may be selected to be spatially more distance from other programmable logic sectors 48 in the same group. In one example, two adjacent programmable logic sectors 48 may be scheduled not to begin a CRAM read operation at the same time, thereby reducing an impact on the power distribution network (PDN) 56 on nearby programmable logic sectors 48. In other examples, how closely different programmable logic sectors 48 of a group having the same CRAM read start times may vary depending on current operation of the integrated circuit device 12/FPGA 40 (e.g., a condition of the power distribution network, condition of the operation of the integrated circuit device 12, and so forth).

Figure 9:
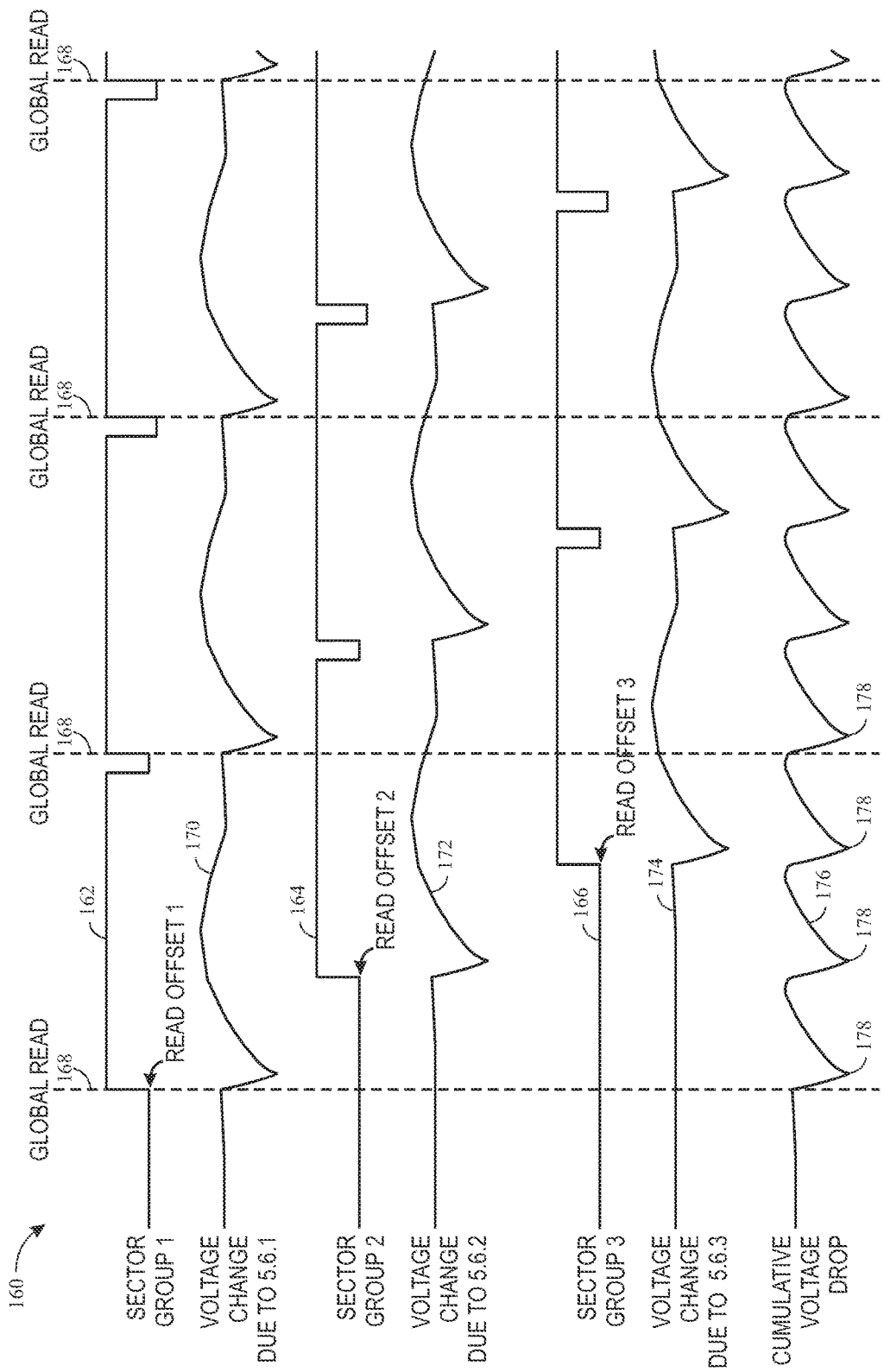
FIG. 9 is a timing diagram illustrating the use of the circuitry shown in FIG. 8, in accordance with an embodiment.

A timing diagram 150 shown in FIG. 9 illustrates the impact of offsetting the start of CRAM read operations in different programmable logic sectors 48. Active CRAM read operations of a first group of programmable logic sectors 48 are represented by numeral 162, active CRAM read operations of a second group of programmable logic sectors 48 are represented by numeral 164, and active CRAM read operations of a third group of programmable logic sectors 48 are represented by numeral 166. The CRAM reads indicated by numeral 162 begin at a time indicated by READ OFFSET 1 from a GLOBAL READ time 168 (e.g., 0 ns after the GLOBAL READ time). A voltage change signal 170 caused by the CRAM reads indicated by numeral 162 initially dip but soon recover in time for the next READ OFFSET 2. At this point, CRAM reads indicated by numeral 164 begin at a time indicated by READ OFFSET 2 from the GLOBAL READ time 168 (e.g., 66 ns after the GLOBAL READ time). A voltage change signal 172 caused by the CRAM reads indicated by numeral 164 also initially dip but soon recover in time for the next READ OFFSET 3. Likewise, CRAM reads indicated by numeral 166 begin at a time indicated by READ OFFSET 3 from the GLOBAL READ time 168 (e.g., 132 ns after the GLOBAL READ time). A voltage change signal 174 caused by the CRAM reads indicated by numeral 166 also initially dip but soon recover in time for the CRAM reads indicated by numeral 162 to begin once more. Cumulatively, the voltage drops may be distributed as shown by a voltage signal 176 so that voltage drops 178 do not overlap, and therefore do not total beyond an unacceptable amount of power drawn on the power distribution network 56.

In some cases, certain behavior of the power distribution network 56 may be monitored and may be used to adjust the CRAM read operations. Adjusting the CRAM read operations may include adjusting the number, location, and offset of programmable logic sectors 48 of groups of programmable logic sectors 48 that initiate CRAM reads so as to keep noise on the power distribution network 56 below a desired threshold. Adjusting the CRAM read operations may also include temporarily stopping the CRAM read operations.

Figure 10:
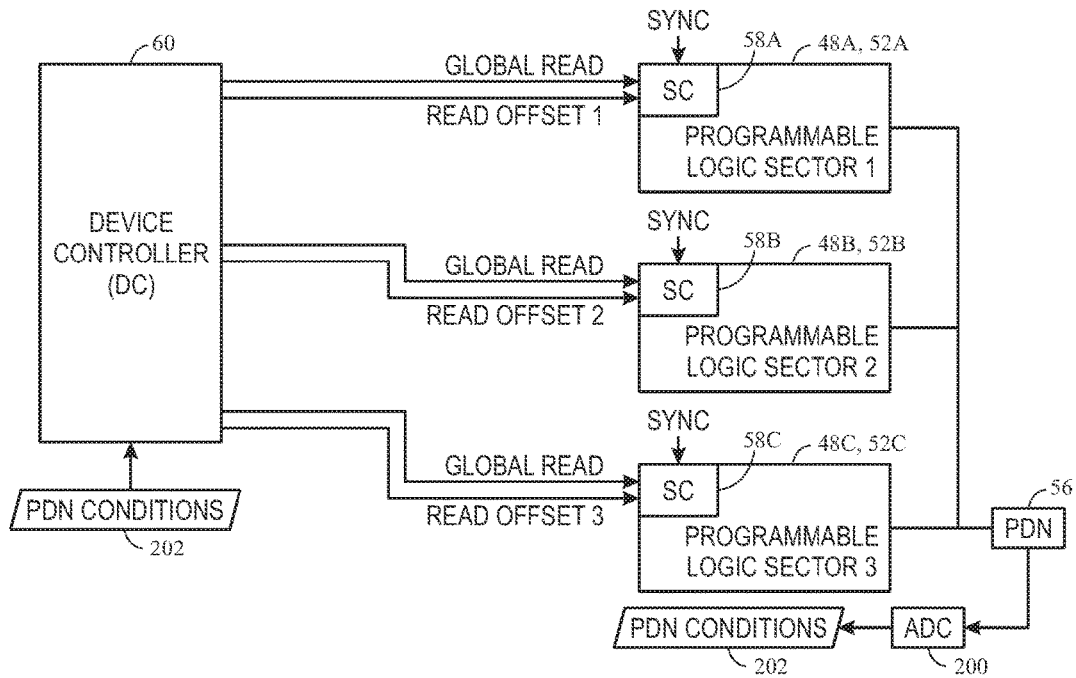
FIG. 10 is a block diagram representing circuitry including a device controller that may adjust parameters of CRAM reads depending on conditions of the power distribution network, in accordance with an embodiment.
Figure 11:
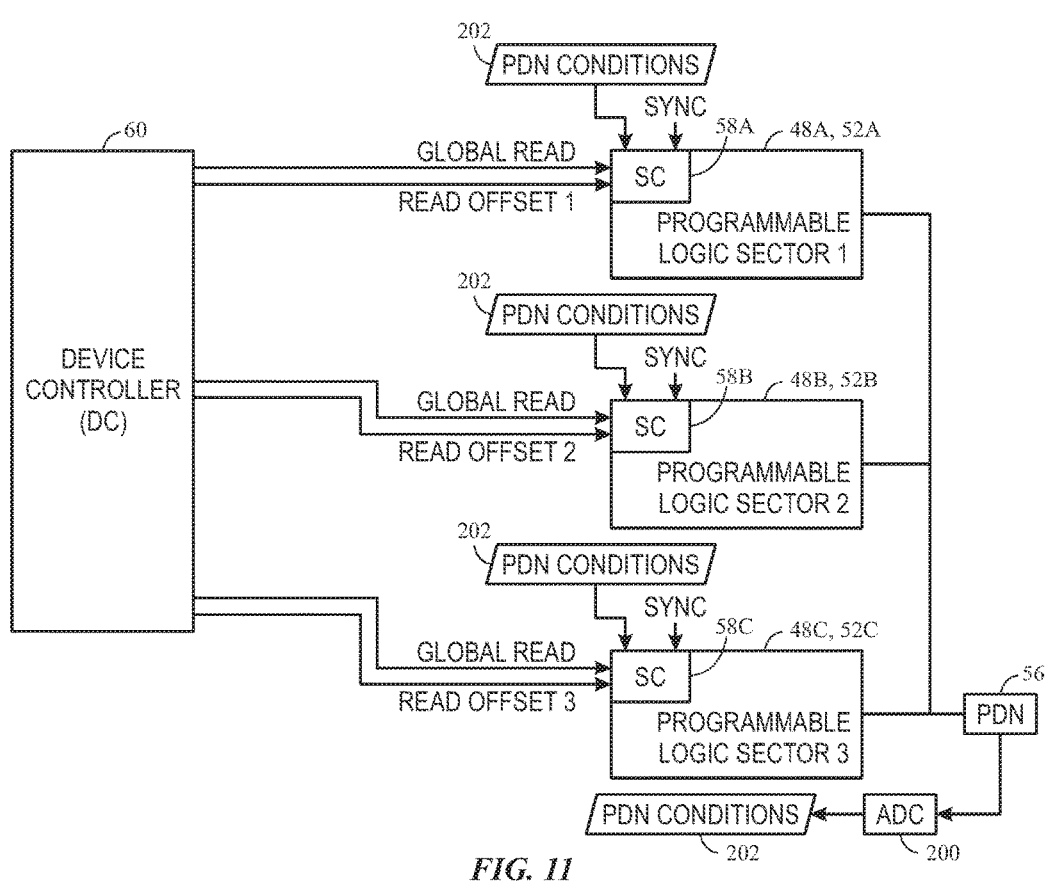
FIG. 11 is a block diagram representing circuitry including sector controllers that may adjust parameters of CRAM reads depending on conditions of the power distribution network, in accordance with an embodiment.
Figure 12:
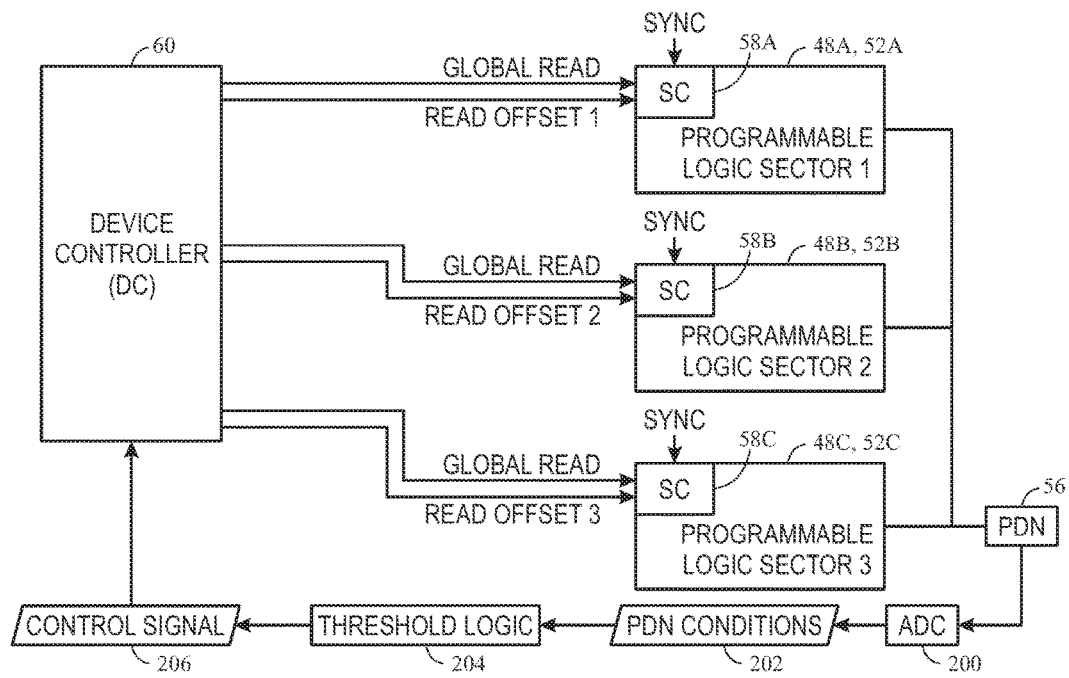
FIG. 12 is a block diagram representing circuitry including threshold logic that may generate a control signal for adjust parameters of CRAM reads depending on conditions of the power distribution network, in accordance with an embodiment.

In examples shown in FIGS. 10 and 11, an analog-to-digital controller (ADC) 200 may read one or more conditions from the power distribution network 56, such as noise, voltage, and/or peak current on the power distribution network 56. The ADC 200 may output a digital signal indicating power distribution network conditions 202, which may be used by the device controller 60, as shown in FIG. 10, and/or the sector controllers 58 as shown in FIG. 11, to adjust CRAM read operations. Additionally or alternatively, as shown in FIG. 12, threshold logic 204 may compare the power distribution network conditions 202 to a threshold value and generate a control signal 206 that causes the device controller 60 to adjust the CRAM read operations. The threshold logic 204 may be programmable or hardened logic.

Figure 13:
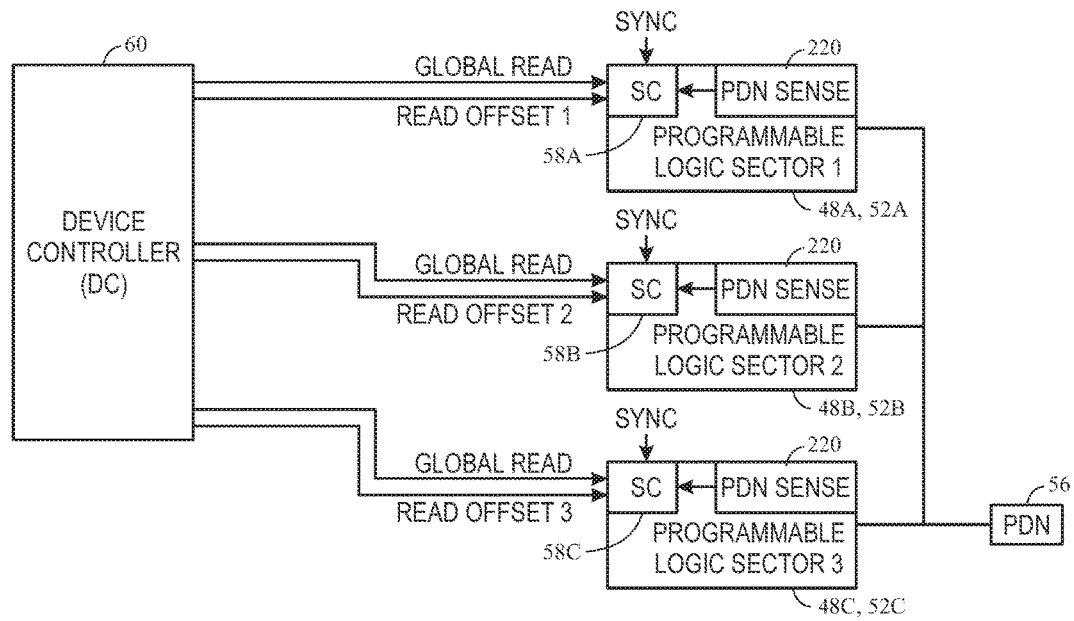
FIG. 13 is a block diagram representing circuitry including a sensitized circuit in programmable logic that may indicate conditions of the power distribution network to enable adjustment of parameters of CRAM reads, in accordance with an embodiment.
Figure 14:
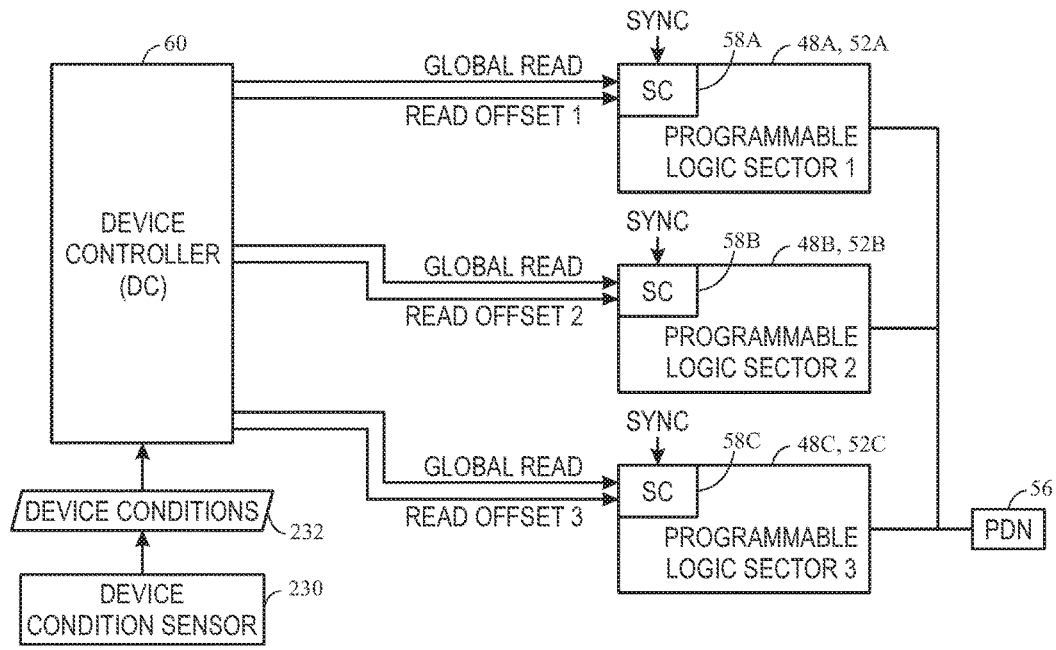
FIG. 14 is a block diagram representing circuitry including a device controller that may adjust parameters of CRAM reads depending on conditions of the integrated circuit device, such as temperature, that may affect the power distribution network, in accordance with an embodiment.

In another example shown in FIG. 13, a sensitized circuit 220 may operate to sense a power distribution network noise, where the sensitized circuit 220 may fail when a noise margin on the power distribution network 56 exceeds an acceptable level, providing a control signal to sector controllers 58 (and/or the device controller 60). As indicated in FIG. 14, other conditions of the integrated circuit device 12 may also be monitored, such as by a device condition sensor 230 that may obtain device conditions 232, which may be used by the device controller 60 and/or the sector controllers 58. By way of example, the device condition sensor 230 may be a temperature sensor and the device conditions 232 may include a temperature of the integrated circuit device 12.

Figure 15:
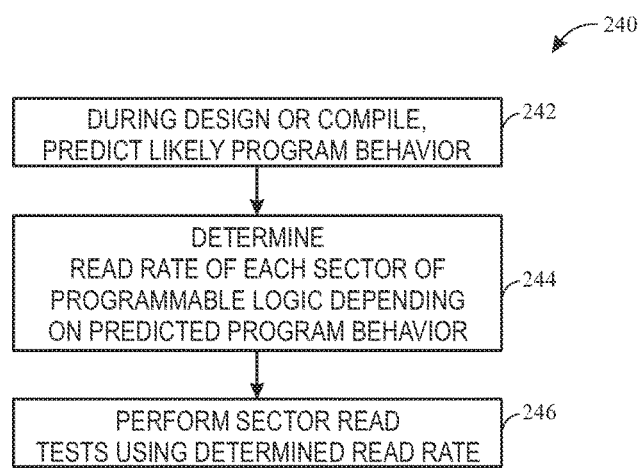
FIG. 15 is a flowchart of a method for modifying a circuit design to control CRAM reads of sectors of programmable logic depending on a predicted behavior of the circuit design, in accordance with an embodiment.

In some cases, the CRAM reads may be coordinated based on a predicted program behavior of a circuit design, as shown by a flowchart 240 of FIG. 15. During a design or compile phase in the design software 14 and/or the compiler 16, a likely program behavior of the program (bitstream) 18 may be predicted (block 242). One example of a predicted likely program behavior may include a peak user current, average user current, sensitivity of the program (bitstream) 18 to noise on the power distribution network, and so forth. The program (bitstream) 18 (e.g., a circuit design) may be modified to include an indication of a read rate of one or more of the programmable logic sectors 48 (e.g., each sector) and/or a corresponding read offset. Other aspects of the CRAM read operations may also be controlled by the modification of the program (bitstream) 18, such as adjusting the number, location, and offset of programmable logic sectors 48 of groups of programmable logic sectors 48 that initiate CRAM reads so as to keep noise on the power distribution network 56 below a desired threshold. Adjusting the CRAM read operations may also include modifications that temporarily stop the CRAM read operations depending on the predicted likely program behavior. The modification may be made depending on the predicted program behavior to keep noise on the power distribution network 56 below a desired threshold (block 244). The CRAM reads of the programmable logic sector 48 may be formed using the determined number, location, and/or offsets of the programmable logic sector 48 (block 246).

Figure 16:
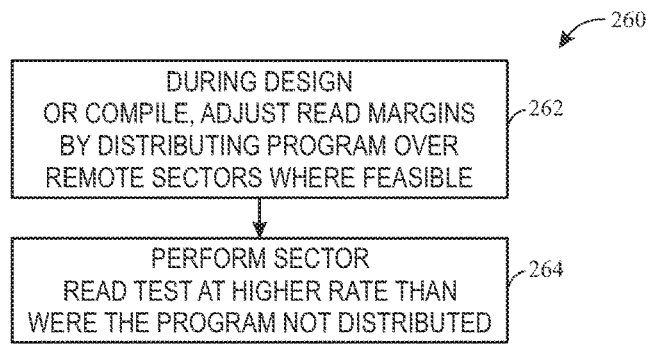
FIG. 16 is a flowchart of a method for modifying a circuit design to improve read margins by distributing the program over remote sectors, in accordance with an embodiment.

In another example shown by a flowchart 260 in FIG. 16, during a design or compile phase in the design software and/or the compiler 16, CRAM read margins may be adjusted by distributing the program (bitstream) 18 (e.g., circuit design) to remote programmable logic sectors 48 where feasible (block 262). This may avoid putting too much strain on any one local portion of the power distribution network 56, and therefore may improve margins of the integrated circuit 12. This may also allow CRAM reads at a higher rate than were the program (bitstream) 18 not so modified (block 264).

Figure 17:
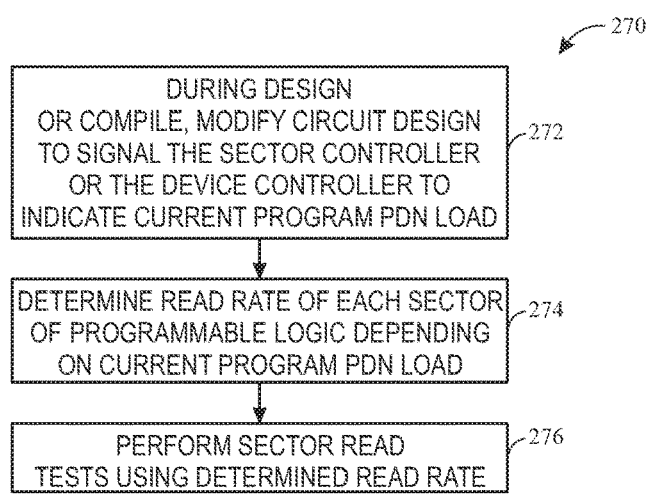
FIG. 17 is a flowchart of a method for modifying a circuit design to control CRAM reads of sectors of programmable logic by indicating a current program load on the power distribution network, in accordance with an embodiment.

In another example shown by a flowchart 270 of FIG. 17, during a design phase or a compile phase of the design software 14 and/or the compiler 16, the program (bitstream) 18 (e.g., circuit design) may be modified to include circuitry to indicate a current power distribution network 56 load of the program to the sector controller 58 or the device controller 60 (block 272). The CRAM read operation may be adjusted or determined (e.g., number, location, and/or offset of programmable logic sectors 48) dynamically depending on the current program load as indicated by the modified program configuration 20 (block 274). The CRAM read operations may be carried out as determined (e.g., using determined CRAM read rates) (block 276).

Figure 18:
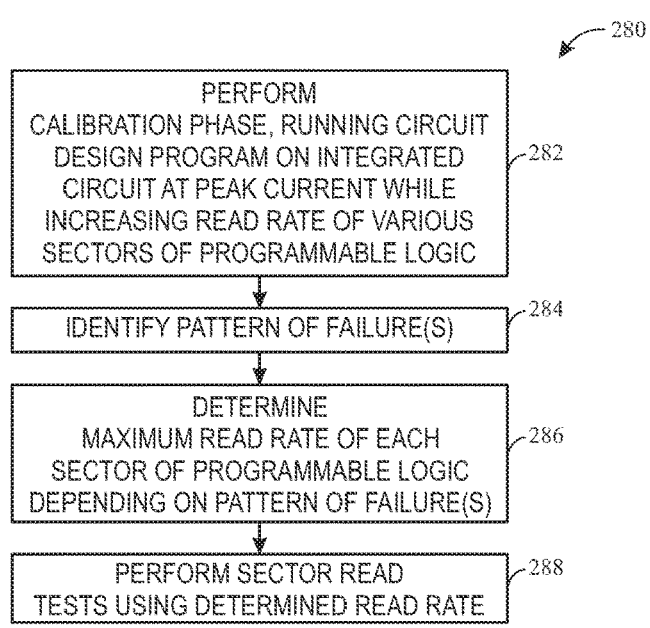
FIG. 18 is a flowchart of a method for controlling CRAM reads of sectors of programmable logic by calibrating a circuit design to identify failures due to sector read rates, in accordance with an embodiment.

In another example shown by a flowchart 280 of FIG. 18, a dynamic manner of determining or adjusting CRAM read operations (e.g., determination or adjustment of number, location, and/or offsets of programmable logic sectors 48) may be determined using a calibration phase. For example, a calibration phase may be performed on an integrated circuit 12 having a particular circuit design programmed in as the program configuration 20. During the calibration phase, the program configuration 20 may be run at peak current while increasing a read rate (e.g., number, location, and/or offsets) until failures arise (block 282). Patterns of failure(s) may be identified (block 284) that may indicate a maximum read rate of different groups of programmable logic sectors 48 depending on the pattern of failures (block 286) and/or an appropriate number, location, and/or offset of programmable logic sectors 48. The CRAM read operations may be performed as determined from the maximum read rate (e.g., number, location, and/or offsets) (block 288).

The methods and devices of this disclosure may be incorporated into any suitable circuit. For example, the methods and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the method operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An integrated circuit device comprising:
   a first sector of programmable logic comprising first configuration memory;
   a second sector of programmable logic comprising second configuration memory;
   a power distribution network that provides power to the first sector of programmable logic and the second sector of programmable logic; and
   control circuitry that:
      causes a first memory read on the first configuration memory to start at a first time, thereby drawing a first spike of power from the power distribution network around the first time; and
      causes a second memory read on the second configuration memory to start at a second time, thereby drawing a second spike of power from the power distribution network around the second time, wherein the first memory read takes place over a first period, and wherein the second time occurs a first offset time from the first time within the first period, such that the first spike of power and the second spike of power are not simultaneous, thereby reducing simultaneous noise or jitter on the power distribution network;

wherein the control circuitry is configured to determine the first time, the first period, the first offset time, or a combination thereof, based at least in part on a voltage level of the power distribution network; and wherein the control circuitry comprises a device controller that issues:
 a global read signal indicating a global read start time to a first sector controller of the first sector of programmable logic and to a second sector controller of the second sector of programmable logic;
 a first read offset signal indicating the first time by offset from the global read start time to the first sector controller of the first sector of programmable logic; and
 a second read offset signal indicating the second time by offset from the global read start time to the second sector controller of the first sector of programmable logic;
 wherein the global read signal and the first read offset signal enable the first sector controller to schedule the first memory read at the first time; and
 wherein the global read signal and the second read offset signal enable the second sector controller to schedule the second memory read at the second time.

2. The integrated circuit device of claim 1, comprising a third sector of programmable logic comprising third configuration memory, wherein the control circuitry causes a third memory read on the third configuration memory to start at a third time, and wherein the third time occurs a second offset time from the first time within the first period.

3. The integrated circuit device of claim 1, wherein the first sector controller schedules the first memory read at least in part by:
 reading a first current time value of a first internal global timer of the first sector controller;
 subtracting the global read start time from the first current time value to obtain a first global start time;
 adding an offset value indicated by the first read offset signal to obtain the first time; and
 initiating the first memory read at the first time.

4. The integrated circuit device of claim 1, comprising an analog-to-digital converter that generates a digital signal indicative of a condition of the power distribution network, wherein the control circuitry determines the first time, the first period, or the first offset time, or any combination thereof, at least partly in response to the digital signal indicative of the condition of the power distribution network.

5. The integrated circuit device of claim 4, wherein the condition of the power distribution network comprises a noise on the power distribution network, the voltage level of the power distribution network, a peak current drawn on the power distribution network, or any combination thereof.

6. The integrated circuit device of claim 1, comprising:
 an analog-to-digital converter that generates a digital signal indicative of a condition of the power distribution network; and
 threshold circuitry that generates a control signal indicating that digital signal indicative of the condition of the power distribution network has crossed a threshold value;
 wherein the control circuitry determines the first time, the first period, or the first offset time, or any combination thereof, at least partly in response to the control signal.

7. The integrated circuit device of claim 1, wherein the first sector of programmable logic or the second sector of programmable logic, or both, comprise a sensitized circuit that fails when an amount of a noise on the power distribution network exceeds a threshold, and wherein a failure of the sensitized circuit causes the control circuitry to change the first time, the first period, or the first offset time, or any combination thereof, to reduce a likelihood of additional noise on the power distribution network due to the first memory read or the second memory read, or both.

8. The integrated circuit device of claim 1, comprising a device condition sensor that generates a signal indicative of a condition of the integrated circuit device that affects behavior of the power distribution network, wherein the control circuitry determines the first time, the first period, or the first offset time, or any combination thereof, at least partly in response to the signal indicative of the condition of the integrated circuit device.

9. The integrated circuit device of claim 8, wherein the device condition sensor comprises a thermal sensor.

10. A method comprising:
 selecting a first sector of a programmable logic device and a second sector of the programmable logic device from among a total number of sectors of the programmable logic device to physically spatially distribute a first memory read of configuration memory of the first sector and a second memory read of configuration memory of the second sector;
 performing the first memory read and the second memory read, wherein each of the first memory read and the second memory read starts at a first start time within a first memory read period, and wherein the first memory read period comprises an amount of time involved to perform the first memory read or the second memory read; and
 performing a third memory read of configuration memory of a third sector of the programmable logic device, wherein the third memory read starts at a second start time within the first memory read period, and wherein the second start time is different from the first start time.

11. The method of claim 10, wherein the second start time is offset from the first start time at least by an amount of time of a read current pulse width plus an amount of time of a read current settling time.

12. The method of claim 10, wherein the second start time is offset from the first start time at least by an amount of time of a read current pulse width, plus an amount of time of a read current settling time, plus an additional uncertainty time.

13. The method of claim 10, wherein the first sector and the second sector are selected based at least partly on a noise on a power distribution network of the programmable logic device, a voltage level of the power distribution network, a peak current drawn on the power distribution network, thermal feedback of the programmable logic device, or any combination thereof, to prevent an amount of noise or jitter on the power distribution network of the programmable logic device from exceeding an acceptable local level.

14. At least one article of manufacture comprising at least one tangible, non-transitory, machine-readable media comprising instructions to:

receive a circuit design into a processor;

modify the circuit design to physically spatially distribute the circuit design over at least configuration memory of a first sector of an integrated circuit device that the circuit design is programmed into and configuration memory of a second sector of the integrated circuit device to improve read margins; and modify the circuit design to enable the integrated circuit device to perform error detection on configuration memory of the integrated circuit device at a first rate by offsetting a first start time of a first memory read of the configuration memory of the first sector and a second start time of a second memory read of the configuration memory of the second sector from a third start time of a third memory read of the configuration memory of a third sector of the integrated circuit device within a read period, wherein the first start time and the second start time are the same.

15. The article of manufacture of claim 14, comprising instructions to predict a peak current load of the circuit design that is expected to occur when the circuit design is programmed into the configuration memory of the integrated circuit device.

16. The article of manufacture of claim 14, wherein the instructions cause the circuit design to be modified to generate an indication to control circuitry of the integrated circuit device of a current load on a power distribution network of the integrated circuit device during runtime.

17. The article of manufacture of claim 14, wherein the instructions comprise instructions to calibrate the circuit design by running circuit design on the integrated circuit device at peak current while varying a read rate until a failure is identified, and wherein the first rate is determined based at least in part on the identified failure.

* * * * *